INVENTOR.
JACOB R. LAUFFER
BY
Kenyon & Kenyon
ATTORNEYS

INVENTOR.
JACOB R. LAUFFER
BY
Kenyon & Kenyon
ATTORNEYS

INVENTOR.
JACOB R. LAUFFER
BY
Kenyon & Kenyon
ATTORNEYS

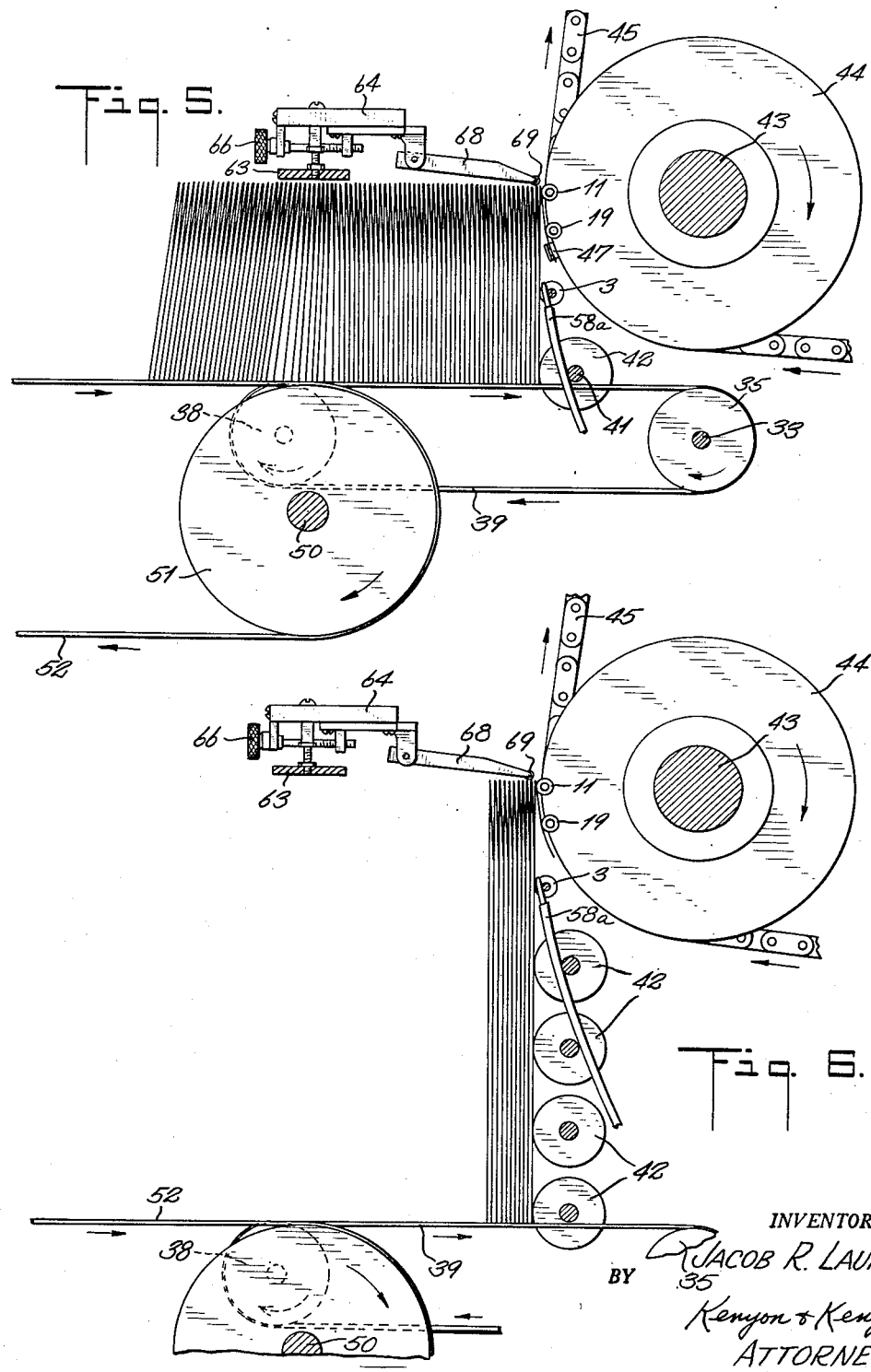

May 29, 1951   J. R. LAUFFER   2,554,578
ENVELOPE FEEDING MACHINE
Filed Feb. 14, 1948   6 Sheets-Sheet 6

INVENTOR.
JACOB R. LAUFFER
BY
Kenyon & Kenyon
ATTORNEYS

Patented May 29, 1951

2,554,578

UNITED STATES PATENT OFFICE 2,554,578

ENVELOPE FEEDING MACHINE

Jacob R. Lauffer, Valley Stream, N. Y., assignor to Miller-Lauffer Printing Equipment Corp., New York, N. Y., a corporation of New York Application February 14, 1948, Serial No. 8,392

2 Claims. (Cl. 271—2)

This invention relates to envelope feeding machines of the type wherein a stack of envelopes is provided a machine with the latter feeding the envelopes singly in succession from one end of the stack. One use of such a machine is to feed envelopes to printing presses.

The primary object is to provide a machine of this character which can satisfactorily operate at a higher envelope feeding rate than can prior art machines of its type. For example, a machine constructed in accordance with this invention is capable of singly feeding envelopes in succession from the end of a stack at the rate of from 50,000 to 100,000 envelopes per hour. Another object is to provide a machine construction that can effect this high rate of feed and yet which is ruggedly constructed and positive in its action. A machine constructed in accordance with this invention can operate at the high feeding rate noted without requiring an unusual amount of servicing and while missing or mutilating only a very few, if any, of the envelopes.

Although the invention has been developed particularly with envelope feeding in mind, some of its principles may prove applicable to the handling of flat articles generally. However, the advantages of the invention are particularly applicable and outstanding in connection with high speed, envelope feeding. A specific example of an envelope feeding machine embodying the principles of the present invention is illustrated by the accompanying drawings in which:

Figs. 5 and 6 are similar views of right hand elevations in the form of vertical sections taken from the line 5—5 in Fig. 4 with certain machine parts removed in the interest of clarity and with the parts shown in Fig. 5 adjusted for relatively short envelopes and, in Fig. 6, adjusted for relatively long envelopes.

Figure 1:
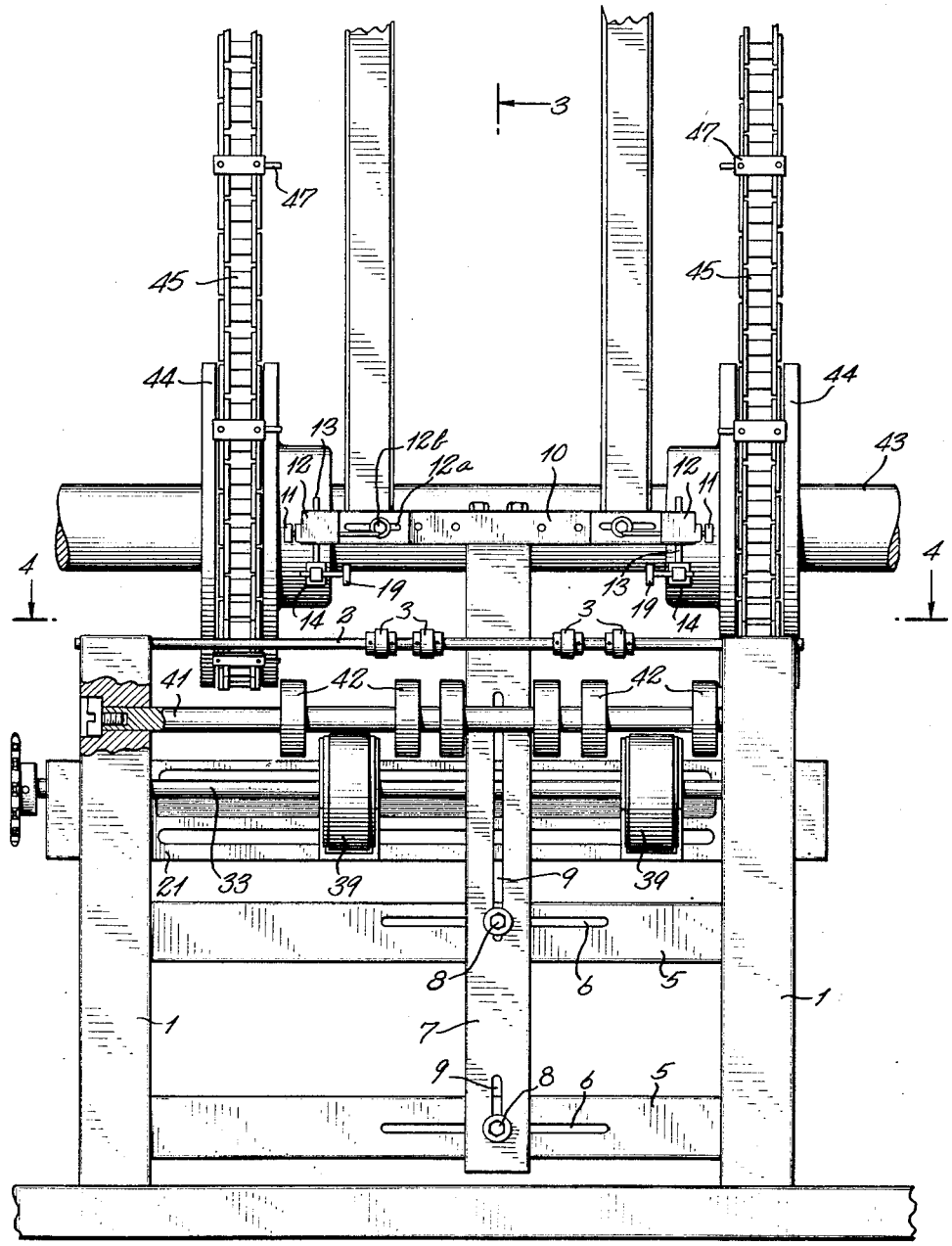
Fig. 1 is a front elevation.
Figure 2:
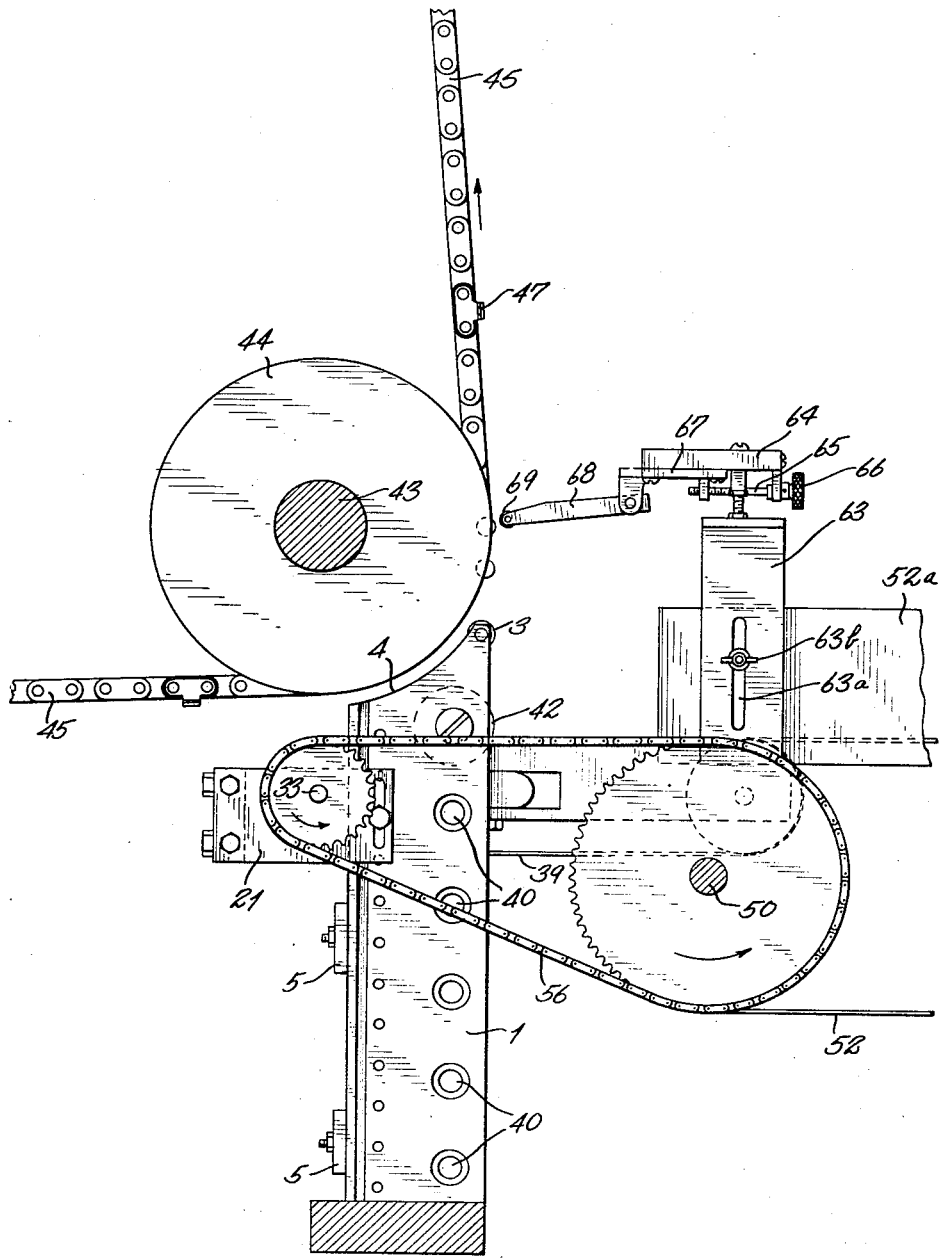
Fig. 2 is a left hand, side elevation.
Figure 3:
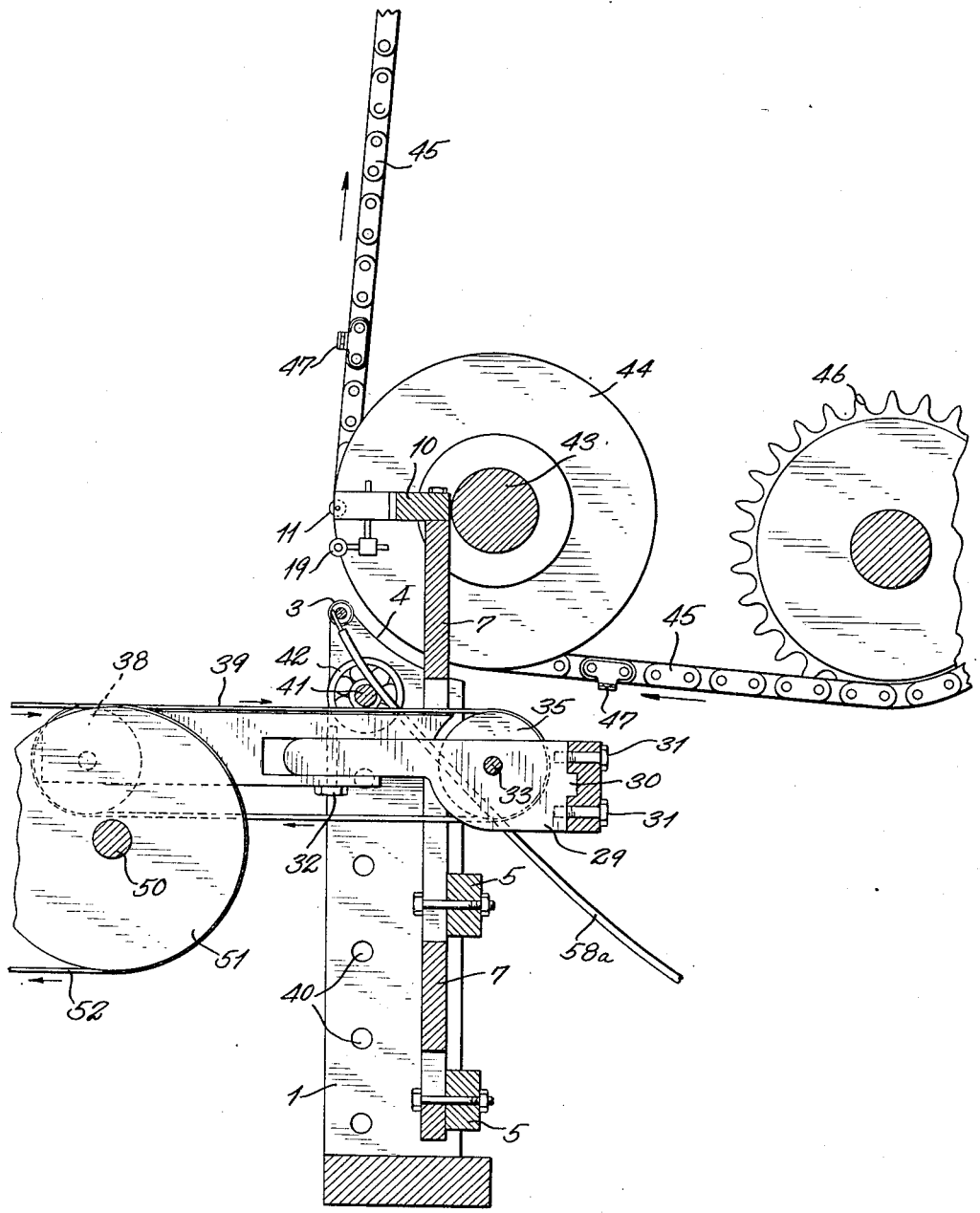
Fig. 3 is a right hand, side elevation in the form of a vertical section taken from the line 3—3 in Fig. 1.
Figure 4:
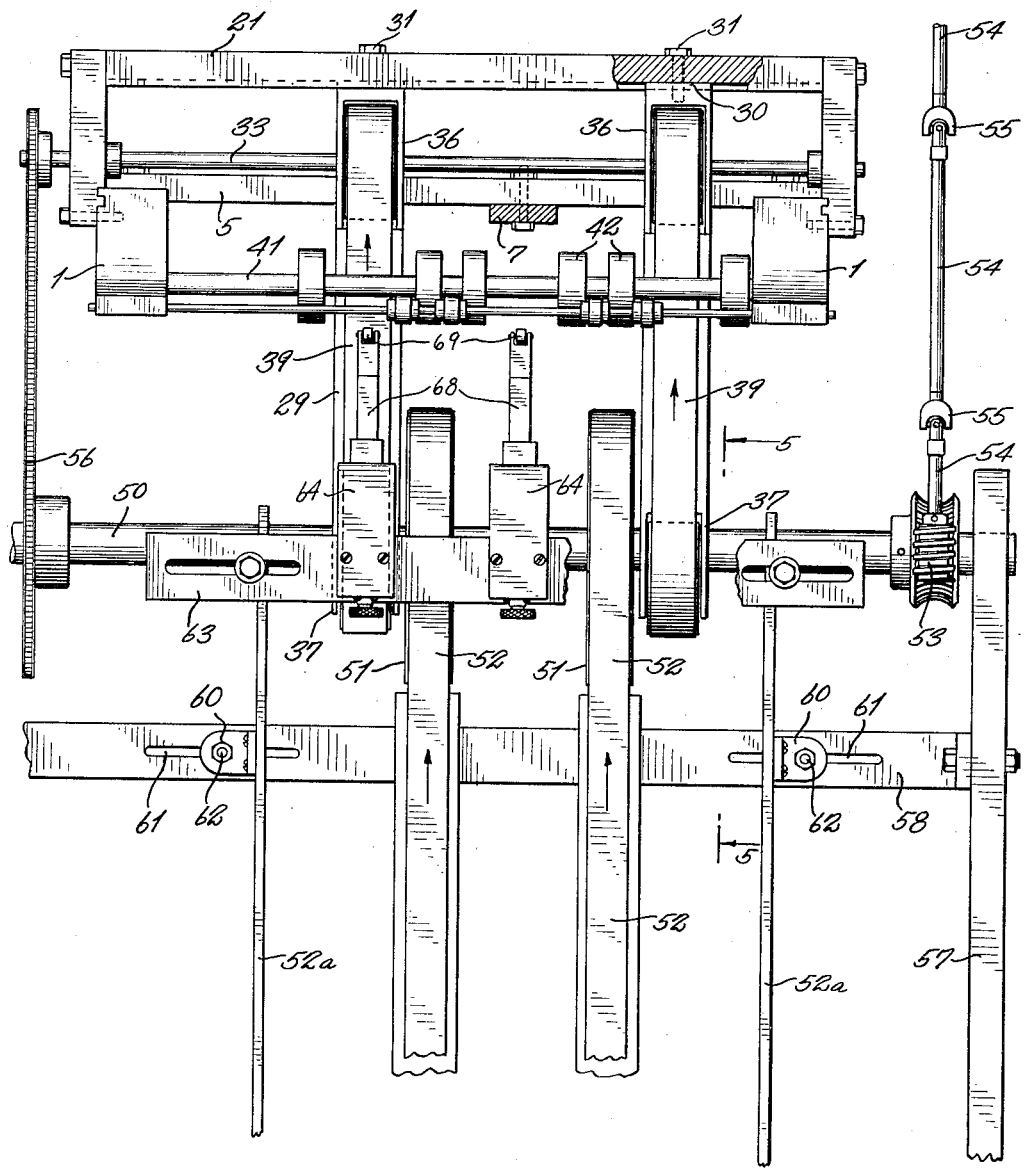
Fig. 4 is a top plan with certain of the elements eliminated to clarify the showing.
Figure 7:
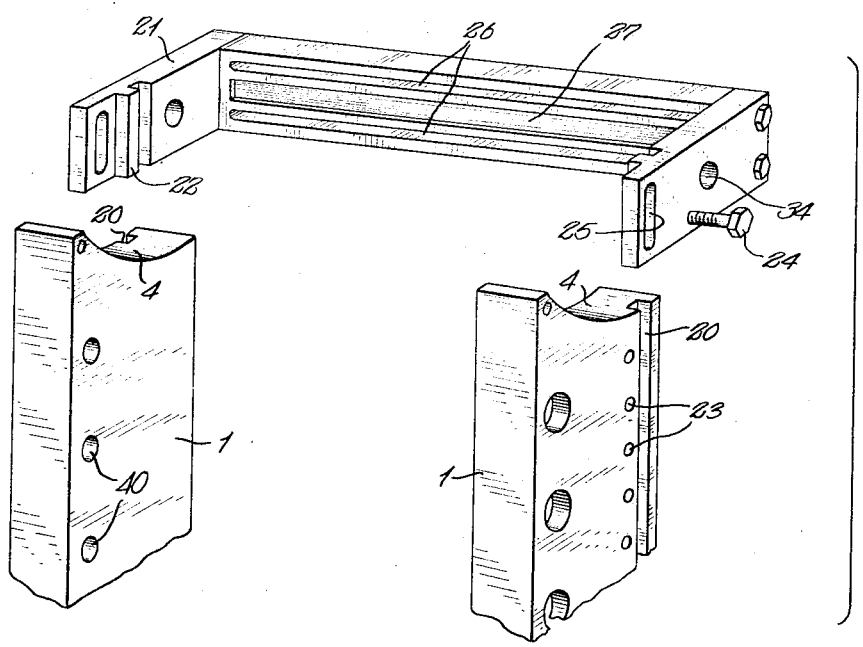
Fig. 7 is an exploded perspective of certain details.

In this illustrated machine two laterally spaced, parallel, vertical columns 1 extend upwardly from a base frame assembly. The tops of these columns transversely mount an horizontal axle 2 journaling laterally spaced rollers 3 so their peripheries extend beyond the front faces of the columns. The top edge 4 of each of the columns arcuately curves downwardly from its front top corner to its back face. Transverse bars 5 are fastened to the back faces of the columns 1 so that these bars are spaced apart in horizontal and relatively parallel relation. Each bar 5 has a horizontal slot 6, and a vertical post 7 is fastened to the two bars 5 by releasable fastenings 8 extending through vertical slots 9 in the post 7 and the horizontal slots 6 in the bars 5. This permits universal adjustment of the post 7 in its vertical plane.

The bars 5 and post 7 are flat rectangular shapes so they are rigidly interfastened when the fastenings 8 are tightened, and the post 7 has a forwardly projecting horizontal, flat bracket 10 rigidly fixed to its top. The bracket 10 extends a considerable distance on either side of the post and its ends mount rollers 11, journaled by sockets 12, with their peripheries tangent a vertical plane that is also tangent the rollers 3. The transverse end portions of the bracket 10 mount these sockets 12 for lateral adjustment by means of slots 12a and releasable fastenings 12b. Vertically depending rods 13 pass through these sockets, having on their lower ends sockets 14 through which forwardly and horizontally projecting rods 15 extend which, in turn, on their forward ends have sockets 16 through which horizontal axles 17 transversely extend inwardly with their inner ends mounting rollers 19. The sockets 12, 14 and 16 are each provided with transverse screws 19a so that the various rods and axles may be rigidly retained in the respective sockets, but so that when the screw fastenings are released universal adjustment of the positions of the rollers 19 is possible. These rollers 19 are normally adjusted so that they are parallel the previously described rollers with their peripheries tangent the above-mentioned vertical plane.

Both columns 1 have vertical grooves 20 in their mutually opposite, outside faces, and a U-shaped rack 21 has the mutually opposite, inner faces of its forwardly projecting arms provided with vertical tongues 22 which ride in these grooves 20 in the columns 1. Thus the rack 21 may slide up and down while being supported against tilting by the columns 1. The columns 1 have a plurality of threaded holes 23 in the form of vertical series extending parallel their grooves 20 and receiving screws 24 passed through slots 25 in the forwardly projecting arms of the rack 21. Therefore, the rack 21 may be slid up and down to any selected position, tthe screws 24 then screwed into the closest ones of the threaded holes 23 in the columns 1, and final vertical adjustment of the rack effected by the vertical sliding motion permitted because of the slots 25, the screws 24 being finally screwed in tightly to lock the rack 21 in position.

The front face of the transverse portion of this rack 21 is opposite the back faces of the columns 1, and this transverse part has parallel horizontal slots 26 spaced both above and below a central and similarly arranged slot 27. This front face mounts two separate horizontally and forwardly projecting arms 29 which are each provided with a tongue 30, slidably fitting the groove 27, and with threaded holes so that screws 31 may be passed through the slots 26 and screwed into these threaded holes. Therefore, either of the horizontally and forwardly projecting arms 29 may be adjusted laterally individually of the other, the groove 27 working with their tongues 30 so they may be slid without tilting.

These forwardly projecting arms 29 are each in the form of slidably telescoped parts with the parts releasably interfastened by screws 32 so as to permit some adjustment of their lengths. The rear ends of both of the arms 29 have transverse and mutually aligned axle holes through which a transverse horizontal axle 33 passes, this axle being journaled by bearings mounted in holes 34 formed in the forwardly extending arms 21 of the previously described U-shaped bracket. Conveyor belt drums 35 are slidably keyed to this axle 33, the arms 29 having straddle parts 36 straddling these drums and keeping them registering with the bars, and the forward ends of the arms 29 have similar straddle parts 37 in which other conveyor belt drums 38 are journaled in peripheral alignment with the drums 35. Conveyor belts 39 are looped over each set of the drums 35 and 38 and maintained in taut condition by proper lengthening of each of the forwardly projecting arms.

In addition to the rollers already described, the columns 1 have vertical series of transversely aligned openings 40 near their forward edges, and these mount one or more transverse axles 41 on each of which a plurality of adjustable laterally spaced rollers 42 are journaled. The number of these axles 41 depends upon the vertical adjustment of the rack 21, the lowermost one of the one or more of the axles 41 that may be used, being required to clear the tops of the belts 39, this limiting the number of axles used. The rollers 42 are parallel the others and peripherally tangent the previously mentioned plane.

It is now apparent that the machine provides what is in effect a vertical, anti-friction wall of rollers having their peripheries tangent the same common vertical plane. In this connection, proper allowance must be made for rollers of varying diameters, the rollers 42, for example, being shown with large diameters, as compared to those of the others, and this requiring that the holes 40 be appropriately placed to the rear.

A transverse axle 43 is journaled so this axle is slightly to the rear of the post 7 with its axis in horizontal alignment with the axes of the rollers 11 on the front ends of the horizontal bracket 10, and this axle mounts wheels 44, the arcuate top edges 4 of the columns 1 providing clearance for these wheels when necessary. There are two of these laterally spaced wheels and endless sprocket chains 45 extend from driving sprocket wheels 46 behind these wheels 44 so as to loop around them and extend upwardly. Other, unillustrated wheels guide these chains to the location where the singly fed envelopes are wanted. These sprocket chains 45 carry a series of sets of transversely aligned and inwardly extending fingers 47 with the sets spaced longitudinally of the chains. Since the axes of the wheels 44 are horizontally aligned with the axes of the rollers 11, the fingers 47 travel tangently respecting the peripheries of these rollers 11, which represent the top rollers of the anti-friction wall previously mentioned. The fingers 47 are relatively thin and flat and they extend from transverse faces 48 provided by mountings 49 carried by the chains 45.

An axle 50 is mounted below and slightly in front of the belt drum 38 and this axle 50 mounts larger conveyor belt drums 51 so that their upper peripheries are horizontally level with the peripheries of the comparatively smaller drums 35 and 38. Conveyor belts 52 extend forwardly from these drums 51 substantially horizontally respecting the belts 39 and in slightly overlapped relationship therewith. This is effected by having the drums 51 straddled by the drums 38.

The axle 50 is turned by worm gearing 53 of which the worm is driven by draive shaft sections 54 working through universal joints 55. This is necessary because, although not shown, the axle 50 must be mounted so it may be raised and lowered with the previously described vertical adjustment of the other parts. A sprocket chain drive 56 carries the rotary motion from the driven axle 50 back to the axle 33, and the gear ratio of this drive is arranged to cause the belts 39 to travel at a higher speed than the belts 52.

The belts 52 function as a magazine and should be adequately long to receive a big stack of envelopes. The stack is horizontally laid on these belts with the envelopes' flaps forwardly and pointing downwardly. Side guides 52a are used to keep the envelopes' edges registered.

The envelope stack is frictionally driven forwardly by the belts 52 and as the foremost envelopes ride on to the short overlapped belts 39 their moving speed is increased by the frictional drive of these belts 39. The envelopes are moved by the frictional drive between the belts and the bottom edges of the envelopes, so the belts may slip relative the envelopes, and as the speed of the envelopes is increased they are pushed against the vertical wall of rollers which provides an abutment for them, this stopping their travel and the belts then slipping. Then as the sets of fingers 47 travel into tangency with the rollers 11 they engage beneath the downwardly pointing envelopes' flaps so as to successively remove, vertically, one envelope after another from between each next adjacent envelope and the abutment or anti-friction wall. Depending on the speeds, and the friction between the envelopes, the various wall rollers may or may not be rotated by the envelopes, but if the friction between the parts becomes too great the envelopes gradually start these rollers rolling with the inertia of the rollers keeping them going. The effective lengths of the belts 39 are carefully proportioned so that they cannot provide too much frictional drive to compact the envelopes thereon so tightly that the inter envelope friction becomes too high to permit the high speed removal of the envelopes. This is one of the advantages of using overlapped conveyers.

In amplification of the above, the sectional drive shaft 54 is turned at a speed driving the belts 39 at a faster rate than the envelope removing rate of the chain driven fingers, and this causes the short stack of envelopes on the belts 39 to be frictionally driven toward or against the anti-friction wall or abutment so that the foremost ones are held as close to true vertical positions as possible. The various parts are adjusted so that the top edges of the envelopes do not project very much, if at all, above tangency with the top rollers 11, and as the fingers rotate upwardly they engage beneath the envelopes' flaps just as their travel becomes tangent therewith. If the effective lengths of the belts 39 were made long enough for them to function as a proper magazine for a large stack of envelopes, they would provide so much friction drive when going at their accelerated rate as to jam the envelopes together and prevent their high speed single removal. The second set of belts 52 may have their driving mechanism correlated with the driving mechanism for the sprocket wheel 46 so that when the accelerated belts have their speed properly correlated with the speed of the chains carrying the fingers, the belts 52 are moving the envelopes along at a rate appropriately equal to the envelopes removing rate of the fingers. When the machine is in operation it is possible to see the envelopes on the long or magazine belt travel forwardly and with the envelopes then jumping forwardly as they ride onto the shorter belts traveling at the faster speed, with the envelopes straightening up to proper vertical positions near the wall or rollers.

The conveyer belts cooperatively drive the envelopes along in the form of a compact horizontal stack at all times, but the envelopes on the short conveyer belts have their compactness increased to firm this stack portion. The abutment is transversely positioned to engage each preceding one of the envelopes at a position spaced beyond the overlap of the two sets of belts, a short distance as compared to the length of the belts 52. The short belts 39 function as a feeder for the chain driven fingers. As previously indicated the fingers 68 function as envelope edge restrainers; the rollers on the ends of these fingers being journaled transversely to the feeding direction of the short belts.

The majority of envelopes have pointed flaps and it is possible to adjust the rollers 19 so that they just span the pointed flaps while supporting the bodies of the envelopes fairly close to their tops. This leaves the flaps free for engagement therewith by the fingers 47. Preferably a nozzle 58 is positioned to point upwardly toward the envelopes' flaps and eject a jet of compressed air to force the flaps out and assure their engagement by the fingers. In some instances it may be desirable to adjust the rollers 19 slightly beyond the plane of tangency of the other rollers and at such positions as to be engaged by the envelope flaps, whereby to limit the amount the envelopes' flaps are blown outwardly. When the machine is operating at high speeds, however, the envelopes' flaps do not have much time to blow out and this expedient is usually unnecessary.

Different lengths of envelopes may be handled by vertical adjustment of the bracket 21 and the magazine belts 52. This permits various lengths of envelopes to be handled with their upper edges just about tangent with the rollers 11, which is where the fingers are traveling tangent to the envelopes' tops. Different widths of envelopes may be handled by laterally adjusting the various parts. One preferable arrangement is to have the right hand belt elements fixedly positioned while adjusting the left hand ones. The various wheels may be secured to the various axles by set screws to permit this adjustment. This is likewise true of the various rollers, and extra rollers may be provided which are not in use when narrow envelopes are being fed, but which may be brought into use for the longer envelopes. It has already been mentioned that a multiplicity of rollers 35 may be used vertically. In Fig. 5 the machine is using only one lateral set of these rollers, while in Fig. 6 four sets are shown in use, the latter figure showing the machine feeding the longer envelopes.

The axle 50 and the other one, which is not shown, but which is required for the belts 52, are journaled by a longitudinally extending frame 57, having cross bars 58 mounting the vertical envelope guides 52a which keep the envelopes' edges aligned as the stack of envelopes is conveyed forwardly by the magazine belts 52. These guides 52a have horizontal brackets 60 which rest on the horizontal or transverse bars 58, the latter having slots 61 so that screw fastenings 62 may adjustably fasten these brackets 60 to them. The envelope guides 59 are adjusted as required by the widths of the envelopes and to cause them to advance in alignment with the belts 59.

A U-shaped bracket 63 has its legs transversely adjustable and depending so as to straddle the vertical envelope guides 59. These legs are adjusted to the guides for relative vertical adjustment, the adjustable features just mentioned being effected by providing the parts with slots 63a and screw fasteners 63b in the general manner of the other parts previously described. The top of this bracket is horizontal and supports a plurality of micrometer screw adjustment devices 64 which each comprises a screw 65 provided with a knurled turning knob 66 and which is in screw threaded connection with a horizontal sliding support 67 pivotally mounting a finger 68 in the form of a lever projecting toward the rollers 11, and which is freely swinging in a vertical direction. The sliding motion is parallel the belts 39. The bracket legs 63 are adjusted so that the ends of the fingers 68 rest on the top edges of the envelopes, and the knob 66 is turned to bring the finger ends adjacent the rollers 11 which, it will be remembered, is the point where the envelope carrying fingers 47 pick up the envelopes. The forward end of each of the fingers 68 journals a roller 69 under which the top edges of the envelopes roll while lifting the finger 68, the latter having just enough weight to gravitationally press lightly against the top edges of the envelopes.

When the machine is operating at comparatively slow feeding speed the knobs 66 are turned to bring the rollers 69 close to the rollers 11. The rollers 69 are rather small in diameter and they are adjusted so that they are just tangent the top edge of each envelope just preceding the envelope ready to be picked up. Therefore they restrain this envelope from being picked up frictionally by the one that should be and is picked up. The one being picked up rides a little to the front of tangency with the rollers and therefore is quite free for vertical motion. With badly deformed envelopes there is the chance that a group might be picked up by the envelope carrying fingers and in such an event the fingers 68 may swing upwardly without damaging themselves or mutilating the envelopes. Therefore the envelopes may be straightened out and returned to the stack in such instances.

With high feeding speeds it has been found that the foremost envelopes are removed so fast with the envelope feeding device providing the sets of fingers moving upwardly in rapid succession, that the envelopes do not even touch the anti-friction abutment provided by the various rollers. That is to say a space forms between the foremost envelopes in the stack and this abutment. In such instances it is necessary to back off the rollers 69 so that they are properly positioned to function as described above. This requires a very delicate adjustment and is the reason for the micrometer mounting of the fingers. In such instances of high speed operation the anti-friction wall of rollers is important because it prevents curled envelopes or envelopes with bent edges from projecting forwardly and becoming engaged by the envelope carrying fingers. When the envelopes are in good condition and the machine is operating at high speed the various abutment rollers may not rotate at all. In such instances the envelopes merely flow off of the front end of the stack regardless of the fact that the short conveyer belt on which they are resting is continuously trying to force them to feed at a faster rate than they are being removed.

Figures 8, 9:
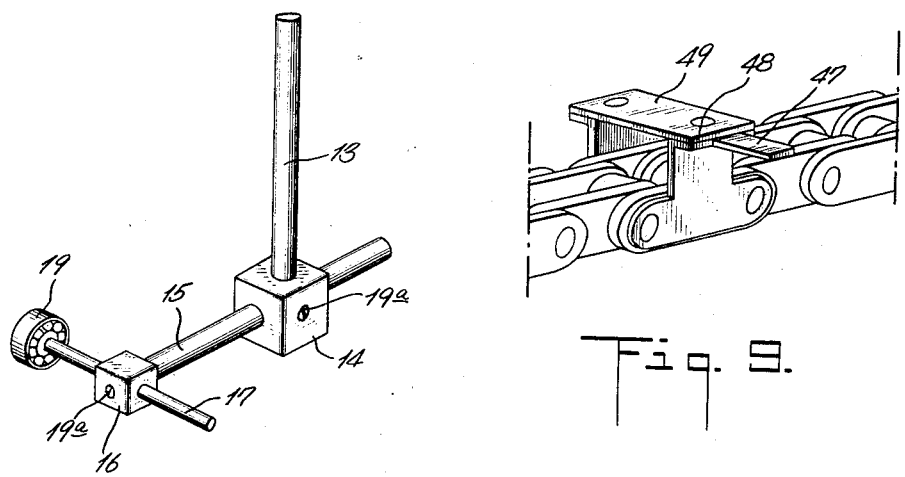
Figs. 8 and 9 are perspectives of other details.

Preferably the sprockets 44 are spaced so the finger faces 48 are spaced more than the widths of the envelopes at the rollers 11 where the envelopes are picked up first, while the unillustrated upper sprockets are spaced so these faces 48 are spaced just about equal to the envelope widths. That is to say, the chains are not parallel throughout, but may diverge and converge slightly. This preferred arrangement permits a positive pick up of the envelopes even if the latter are slightly disarranged, followed almost immediately by proper alignment of the envelopes with their proper path of travel. The faces 48 function as abutments for the envelope side edges and extend as shown by Fig. 9.

I claim:

1. In a printing press having endless chains driven in unison along substantially parallel paths for advancing pre-folded envelopes through a printing position, the combination of a pair of lugs one secured to each chain and adapted to move in unison and in mutually opposed relation as the chains travel, a powered feed belt adapted to propel a moving and normally substantially unbroken stack of envelopes whose edges remote from the flap-fold rest on the belt, towards a receiving position where the concave surfaces of the fold at each end of the flap of the foremost envelope in the stack are simultaneously engaged by said pair of lugs, a bracket fixedly supported on either side of the stack, a finger one end of which is secured to said bracket and the free end of which makes yieldable frictional contact with the moving stack at that edge of the envelopes therein which contain the flap-fold, the said point of contact being adjacent to and slightly spaced from the said receiving position, and an electric motor operatively connected to the chains and the belt for driving them in timed relation with each other.

2. In a machine for printing pre-formed envelopes each having a folded flap, the combination of a pair of endless chains movable in unison and supported to move in substantially parallel paths through a receiving position and thence to a printing position, lugs secured to said chains, said lugs being arranged in working pairs one on each chain and in opposed relation to each other, the distance between the chains being greater than the width of an envelope and the distance between the opposed ends of each working pair of lugs being less than the width of an envelope, a powered feed belt adapted to propel toward the receiving position a moving and normally substantially unbroken stack of envelopes whose edges remote from the flap-fold rest on the belt, side guides arranged to guide the stack in its movement so that the upper edge of the leading envelope which contains the flap-fold is guided to a position between the chains where the concave surfaces of the fold at each end of its flap are in position to be engaged by a working pair of said lugs, a fixed bracket bridging the moving stack and said side guides, and a finger secured to said bracket whose free end is positioned to make yieldable frictional contact with the upper surface of the moving stack at a point spaced from the receiving position, whereby as the stack moves envelopes escape successively from frictional engagement with said finger.

JACOB R. LAUFFER.

REFERENCES CITED

The following references are of record in the file of this patent:

UNITED STATES PATENTS

| Number | Name | Date |
|---|---|---|
| 854,041 | Kenna | May 21, 1907 |
| 1,033,968 | Waldron | July 30, 1912 |
| 1,135,140 | Roberts | Apr. 13, 1915 |
| 1,724,199 | Hoag | Aug. 13, 1929 |
| 2,092,524 | Post | Sept. 7, 1937 |
| 2,163,145 | Johnson | June 10, 1939 |
| 2,449,690 | Chapman | Sept. 21, 1948 |